(12) United States Patent
Gao et al.

(10) Patent No.: US 12,503,679 B2
(45) Date of Patent: Dec. 23, 2025

(54) METHOD AND APPARATUS FOR CONSTRUCTING MICROFLUIDIC BONE ORGANOID-ON-CHIP

(71) Applicant: China-Japan Friendship Hospital (China-Japan Friendship Clinical Medical Research Institute), Beijing (CN)

(72) Inventors: Fuqiang Gao, Beijing (CN); Weiguo Wang, Beijing (CN); Junyou Li, Beijing (CN); Tianyang Liu, Beijing (CN); Wei Sun, Beijing (CN); Zirong Li, Beijing (CN)

(73) Assignee: China-Japan Friendship Hospital (China-Japan Friendship Clinical Medical Research Institute), Beijing (CN)

( * ) Notice: Subject to any disclaimer, the term of this patent is extended or adjusted under 35 U.S.C. 154(b) by 0 days.

(21) Appl. No.: 18/964,723

(22) Filed: Dec. 2, 2024

(65) Prior Publication Data
US 2025/0223533 A1 Jul. 10, 2025

(30) Foreign Application Priority Data
Jan. 4, 2024 (CN) .......................... 202410011062.6

(51) Int. Cl.
*C12M 3/06* (2006.01)
*B01L 3/00* (2006.01)
*C12N 5/077* (2010.01)

(52) U.S. Cl.
CPC ....... *C12M 23/16* (2013.01); *B01L 3/502707* (2013.01); *C12N 5/0654* (2013.01);
(Continued)

(58) Field of Classification Search
None
See application file for complete search history.

(56) References Cited

U.S. PATENT DOCUMENTS 6,143,496 A * 11/2000 Brown .................. B01L 3/5027
436/805
6,418,968 B1 * 7/2002 Pezzuto .............. F16K 99/0057
137/833

(Continued)

*Primary Examiner* — Brian R Gordon
(74) *Attorney, Agent, or Firm* — Bayramoglu Law Offices LLC

(57) ABSTRACT

A method for constructing a microfluidic bone organoid-on-chip can continuously observe the impacts of different external factors on a bone tissue structure based on the "ternary regulation theory" of bone angiogenesis-bone resorption-osteogenesis coupling. The method includes: (1) building a visual three-dimensional cell cultivation platform to continuously observe impacts of different external factors on a ternary regulation theory based on angiogenesis of osteoclast precursors, osteoblasts and osteoclasts, such that a user is allowed to directly observe interactions among various kinds of cells; (2) designing microfluidic channels in a chip to allow a reagent involved to present a concentration gradient distribution in the chip; and (3) adding three bioinks including osteoblasts, osteoclasts and vascular endothelial cells respectively, so as to reflect the three cell components individually, in pairs, and as a whole in the chip. An apparatus for constructing a microfluidic bone organoid-on-chip is further provided.

2 Claims, 3 Drawing Sheets

(52) U.S. Cl.
CPC ... *B01L 2200/16* (2013.01); *B01L 2300/0819* (2013.01); *B01L 2300/0867* (2013.01); *B01L 2300/0887* (2013.01); *C12N 2513/00* (2013.01)

(56) References Cited

U.S. PATENT DOCUMENTS

| | | | | |
|---|---|---|---|---|
| 6,572,830 | B1* | 6/2003 | Burdon | B01J 19/0093 422/129 |
| 6,686,184 | B1* | 2/2004 | Anderson | G01N 33/5005 435/177 |
| 7,201,873 | B2* | 4/2007 | Tanaka | B01L 3/545 422/50 |
| 7,351,303 | B2* | 4/2008 | Liu | B01L 3/502707 156/308.2 |
| 10,053,728 | B2* | 8/2018 | Ririe | B01L 3/502 |
| 10,737,261 | B1* | 8/2020 | Nath | B01L 3/502 |
| 2002/0124896 | A1* | 9/2002 | O'Connor | B01F 25/432 137/833 |
| 2002/0185184 | A1* | 12/2002 | O'Connor | B01F 33/30 137/822 |
| 2002/0187072 | A1* | 12/2002 | Karp | B01F 35/7182 422/946 |
| 2003/0064507 | A1* | 4/2003 | Gallagher | B82Y 30/00 435/6.15 |
| 2003/0106799 | A1* | 6/2003 | Covington | B29C 66/929 204/600 |
| 2003/0175162 | A1* | 9/2003 | Anazawa | B01L 3/502707 422/537 |
| 2004/0018115 | A1* | 1/2004 | Karp | B01L 3/5027 422/400 |
| 2004/0155211 | A1* | 8/2004 | Takeda | F04B 19/24 251/61 |
| 2004/0238052 | A1* | 12/2004 | Karp | B01J 19/0093 137/822 |
| 2004/0248125 | A1* | 12/2004 | Stremler | B01F 25/50 506/17 |
| 2005/0186585 | A1* | 8/2005 | Juncosa | B01L 7/525 435/287.2 |
| 2005/0229696 | A1* | 10/2005 | Takayama | B01F 25/4338 73/204.26 |
| 2006/0140829 | A1* | 6/2006 | Tabata | B01J 19/0093 422/198 |
| 2006/0153741 | A1* | 7/2006 | Yoshida | B01F 25/432 156/60 |
| 2006/0154361 | A1* | 7/2006 | Wikswo | C12M 23/16 435/297.5 |
| 2007/0014695 | A1* | 1/2007 | Yue | B01L 3/502707 422/400 |
| 2007/0084706 | A1* | 4/2007 | Takayama | C12M 23/34 200/182 |
| 2007/0202531 | A1* | 8/2007 | Grover | B01L 3/5027 435/287.2 |
| 2010/0216193 | A1* | 8/2010 | Gomi | B01L 3/50851 435/286.1 |
| 2010/0261286 | A1* | 10/2010 | Kim | B01L 3/502707 422/69 |
| 2010/0291588 | A1* | 11/2010 | McDevitt | G01N 33/491 435/287.1 |
| 2010/0296972 | A1* | 11/2010 | Miura | G01N 21/05 422/63 |
| 2011/0030888 | A1* | 2/2011 | Ayliffe | B01L 3/502707 156/247 |
| 2011/0045993 | A1* | 2/2011 | Kent | B01L 3/502776 382/128 |
| 2011/0123398 | A1* | 5/2011 | Carrilho | F16K 99/0001 422/68.1 |
| 2011/0162439 | A1* | 7/2011 | Ayliffe | B01L 3/502715 73/61.71 |
| 2011/0201099 | A1* | 8/2011 | Anderson | B29C 70/682 422/68.1 |
| 2013/0026037 | A1* | 1/2013 | Bryan | B01L 3/502715 204/409 |
| 2013/0034869 | A1* | 2/2013 | Whitesides | B01L 3/502738 435/7.92 |
| 2013/0258318 | A1* | 10/2013 | Ayliffe | B01L 3/502715 356/72 |
| 2014/0094377 | A1* | 4/2014 | Ayliffe | G01N 15/1023 506/9 |
| 2014/0264082 | A1* | 9/2014 | Ayliffe | G01N 21/645 250/459.1 |
| 2014/0363838 | A1* | 12/2014 | Mcdevitt | G01N 33/5005 435/29 |
| 2015/0093838 | A1* | 4/2015 | Landers | B32B 38/145 156/182 |
| 2015/0140671 | A1* | 5/2015 | Zhang | B01L 3/502707 436/69 |
| 2015/0260709 | A1* | 9/2015 | Shimayama | G01N 33/723 422/69 |
| 2015/0336099 | A1* | 11/2015 | Seddon | F04B 43/043 156/306.6 |
| 2015/0367340 | A1* | 12/2015 | Beachner | B32B 29/005 422/430 |
| 2016/0047740 | A1* | 2/2016 | Park | G01N 21/31 435/15 |
| 2016/0369323 | A1* | 12/2016 | Revilla | B01L 7/52 |
| 2017/0080422 | A1* | 3/2017 | Maaskant | B01D 17/0217 |
| 2017/0128008 | A1* | 5/2017 | Chung | A61B 5/15 |
| 2017/0151564 | A1* | 6/2017 | Stanwood | B01L 3/502715 |
| 2017/0227525 | A1* | 8/2017 | Griffith | F04B 43/12 |
| 2018/0297028 | A1* | 10/2018 | Lee | B01L 3/50273 |
| 2018/0313765 | A1* | 11/2018 | Landers | B01L 3/5027 |
| 2018/0320125 | A1* | 11/2018 | Levner | B01L 3/502761 |
| 2018/0335376 | A1* | 11/2018 | Ayliffe | G01N 15/1433 |
| 2019/0025240 | A1* | 1/2019 | Henry | B81C 3/00 |
| 2019/0076847 | A1* | 3/2019 | Donovan | B01L 9/52 |
| 2020/0030797 | A1* | 1/2020 | Shartle | B01L 3/502715 |
| 2020/0179928 | A1* | 6/2020 | Levner | B05D 3/067 |
| 2020/0238283 | A1* | 7/2020 | Raghunathan | B01L 3/502715 |
| 2021/0370299 | A1* | 12/2021 | Stahl | B01L 7/04 |
| 2022/0347680 | A1* | 11/2022 | Wernerehl | B01L 3/502707 |
| 2022/0387996 | A1* | 12/2022 | Beckers | B01L 3/502715 |
| 2023/0193182 | A1* | 6/2023 | Young | C12M 29/10 435/297.2 |
| 2024/0226887 | A1* | 7/2024 | Kim | B01L 7/52 |
| 2024/0390895 | A1* | 11/2024 | Sanati-Nezhad | B01L 3/502715 |
| 2025/0025877 | A1* | 1/2025 | Fleischman | B01L 3/502746 |

* cited by examiner

METHOD AND APPARATUS FOR CONSTRUCTING MICROFLUIDIC BONE ORGANOID-ON-CHIP

CROSS REFERENCE TO THE RELATED APPLICATIONS

This application is based upon and claims priority to Chinese Patent Application No. 202410011062.6, filed on Jan. 4, 2024, the entire contents of which are incorporated herein by reference.

TECHNICAL FIELD

The present disclosure belongs to the technical field of osteocyte cultivation, and in particular relates to a method for constructing a microfluidic bone organoid-on-chip and an apparatus for constructing a microfluidic bone organoid-on-chip according to the method.

BACKGROUND

According to the traditional theory, the regulation of bone metabolism is completed mainly through the direct regulation of osteoblasts and osteoclasts, namely, the "binary regulation" theory. The research and clinical work have been dominated by this theory for more than 30 years. In the process of bone tissue repair, osteoblasts, osteoclasts, and bone marrow microvascular endothelial cells (BMECs) are associated with each other through signaling molecules to interact with each other. There are close temporal and spatial relationships between osteogenesis and angiogenesis, which is known as "angiogenic-osteogenic coupling". The studies in recent years have shown that related bioactive factors secreted by osteoclast precursors play an important role in the angiogenic-osteogenic coupling process. Osteoclast precursors are produced from hematopoietic stem cells in the bone marrow. Many cytokines or growth factors can directly or indirectly induce the production of osteoclasts from osteoclast precursors to mediate the bone resorption. Osteoclast precursors are key cells that promote the bone-specific angiogenesis and maintain the normal functions of osteoblasts and osteoclasts. The "ternary regulation theory" based on angiogenesis of osteoclast precursors, osteoblasts and osteoclasts is established and verified.

Unlike the traditional "binary regulation theory" of osteoblasts and osteoclasts, the ternary regulation theory believes that the angiogenesis in a bone tissue also plays an important role in osteogenesis, resulting in the formation of an angiogenesis-osteogenesis-osteoclast ternary regulatory mechanism. Studies have shown that related bioactive factors secreted by osteoclast precursors promote the angiogenesis by recruiting endothelial progenitor cells (EPCs) and mesenchymal stem cells (MSCs), thereby playing a role of regulating the osteogenesis. This emerging research finding has important guiding significance for the treatment of bone diseases such as osteoporosis, osteonecrosis, and metabolic bone disease. However, it is still a challenge to allow a controllable and visible manual intervention for the ternary regulation mechanism.

Currently, there are only studies based on animal models and "traditional two-dimensional cultivation" to explore the regulation mechanism of angiogenic-osteogenic coupling. Animal experiments have limitations such as a long experimental cycle and a high experimental cost, and the traditional two-dimensional cultivation cannot reproduce a physiological environment well. Therefore, it is highly desirable to construct a prominent experimental platform to explore a mechanism, principle, and application of the ternary regulation theory deeply.

SUMMARY

In order to overcome the defects of the prior art, the technical problem to be solved by the present disclosure is to provide a method for constructing a microfluidic bone organoid-on-chip. This method can continuously observe the impacts of different external factors on the ternary regulation theory based on angiogenesis of osteoclast precursors, osteoblasts and osteoclasts, can allow a user to directly observe the interactions among various kinds of cells, and can allow a reagent involved to present a concentration gradient distribution in the chip, such that the impacts of the reagent at different concentrations on cells can be observed intuitively and conveniently.

Technical solutions of the present disclosure: A method for constructing a microfluidic bone organoid-on-chip is provided, including the following steps:
(1) building a visual three-dimensional cell cultivation platform to continuously observe impacts of different external factors on a ternary regulation theory based on angiogenesis of osteoclast precursors, osteoblasts and osteoclasts such that a user is allowed to directly observe interactions among various kinds of cells;
(2) designing microfluidic channels in a chip to allow a reagent involved to present a concentration gradient distribution in the chip; and
(3) adding three bioinks including osteoblasts, osteoclasts and vascular endothelial cells respectively to allow the chip to have an osteoblast zone, an osteoclast zone, a vascular endothelial cell zone, an osteoblast-osteoclast double-cell zone, an osteoblast-vascular endothelial cell double-cell zone, an osteoclast-vascular endothelial cell double-cell zone, and an osteoblast-osteoclast-vascular endothelial cell triple-cell zone, so as to reflect three cell components individually, in pairs, and as a whole in the chip.

In the present disclosure, a visual three-dimensional cell cultivation platform is built to continuously observe impacts of different external factors on a ternary regulation theory based on angiogenesis of osteoclast precursors, osteoblasts and osteoclasts such that a user is allowed to directly observe interactions among various kinds of cells, microfluidic channels are designed in a chip to allow a reagent involved to present a concentration gradient distribution in the chip, and three bioinks including osteoblasts, osteoclasts and vascular endothelial cells respectively are added to allow the chip to have an osteoblast zone, an osteoclast zone, a vascular endothelial cell zone, an osteoblast-osteoclast double-cell zone, an osteoblast-vascular endothelial cell double-cell zone, an osteoclast-vascular endothelial cell double-cell zone, and an osteoblast-osteoclast-vascular endothelial cell triple-cell zone, so as to reflect the three cell components individually, in pairs, and as a whole in the chip. Therefore, the method can continuously observe the impacts of different external factors on the ternary regulation theory based on angiogenesis of osteoclast precursors, osteoblasts and osteoclasts, can allow a user to directly observe the interactions among various kinds of cells, and can allow a reagent involved to present a concentration gradient distribution in the chip, such that the impacts of the reagent at different concentrations on cells can be observed intuitively and conveniently.

An apparatus for constructing a microfluidic bone organoid-on-chip is also provided, including:
    a top layer (1), where the top layer is a flat plate configured to seal a top of the apparatus;
    a liquid inlet layer (3) provided with a first left liquid inlet (10) and a first right liquid inlet (11) at left and right edges, respectively, where the first left liquid inlet and the first right liquid inlet are centro-symmetrical and each have a specified volume to store a cell culture solution; a central hole (14) is formed at a center of the liquid inlet layer and communicates with the first left liquid inlet and the first right liquid inlet through a first left channel (12) and a first right channel (13), respectively; and three second liquid inlets (15, 16, 17) are formed in an equilateral triangle around the central hole, and the second liquid inlets each are filled with a bioink;
    a support layer (5) including a symmetrical regularly-polygonal cultivation groove (18), where the cultivation groove encloses the second liquid inlets from below, the bioink is cured after entering the support layer, and cells grow in the support layer;
    a first lower interlayer (6) provided with second large circular holes symmetrically at left and right edges, respectively, where three small circular holes are formed in an inverted equilateral triangle around a center;
    a liquid outlet layer (7) provided with a left waste liquid port (22) and a right waste liquid port (23) symmetrically at left and right edges, where the left waste liquid port and the right waste liquid port communicate with the second large circular holes, respectively; liquid outlets (19, 20, 21) that are not located in the same vertical plane as the second liquid inlets are formed around a center of the liquid outlet layer; and the liquid outlets communicate with the waste liquid ports through outflow channels (24, 25, 26, 27), and the liquid outlets communicate with each other through liquid outlet channels (28, 29, 30); and
    a bottom layer (9), where the bottom layer is a flat plate configured to seal a bottom of the apparatus.

DETAILED DESCRIPTION OF THE EMBODIMENTS

To make the objectives, technical solutions, and advantages of the present disclosure clear, the present disclosure is further described in detail below with reference to the accompanying drawings and specific embodiments. It should be understood that the specific embodiments described here are merely intended to explain the present disclosure, rather than to limit the present disclosure.

In order to make the description of the contents of the present disclosure detailed and complete, an illustrative description is provided below for the implementations and specific embodiments of the present disclosure, but it is not the only form of implementing or applying the specific embodiments of the present disclosure. The implementations cover the characteristics of a plurality of specific embodiments and the methodological steps and sequences thereof to construct and operate these specific embodiments. However, other specific embodiments may also be used to allow the same or equal functions and step sequences.

Figure 1:
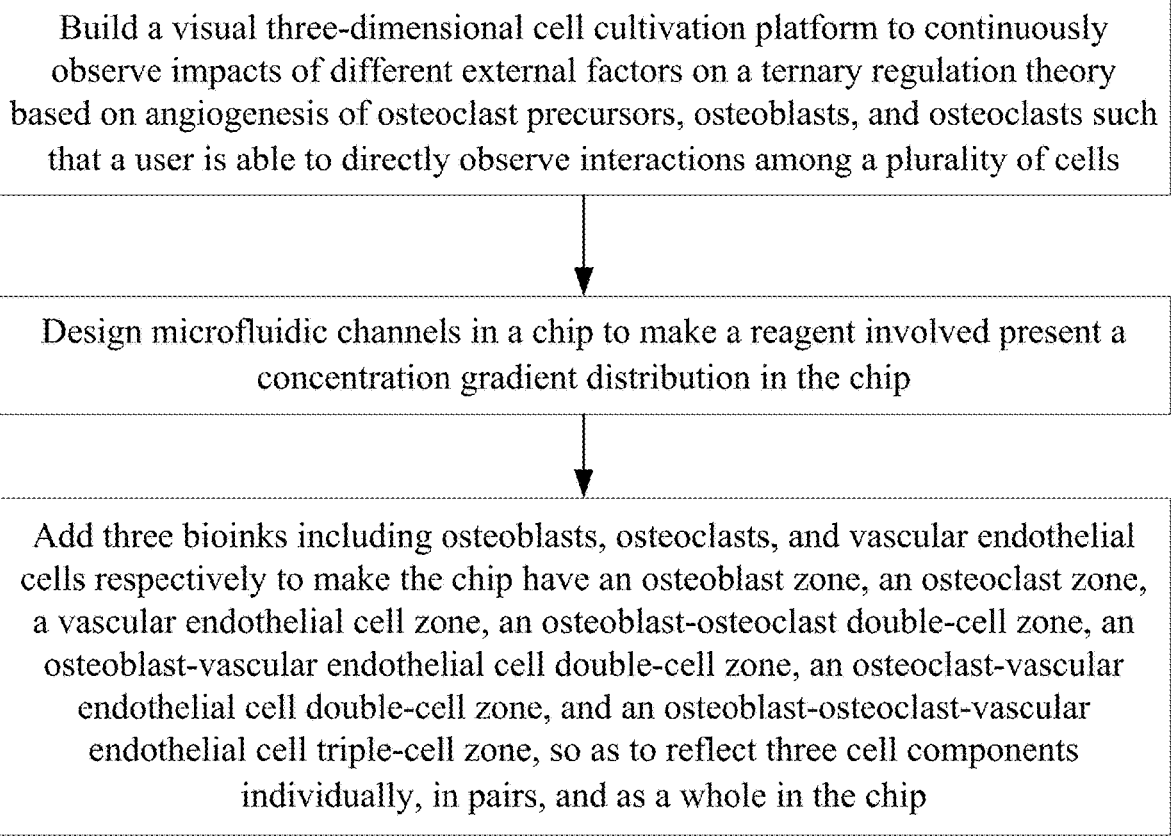
FIG. 1 is a flow chart of the method for constructing a microfluidic bone organoid-on-chip according to the present disclosure.
Figure 2:
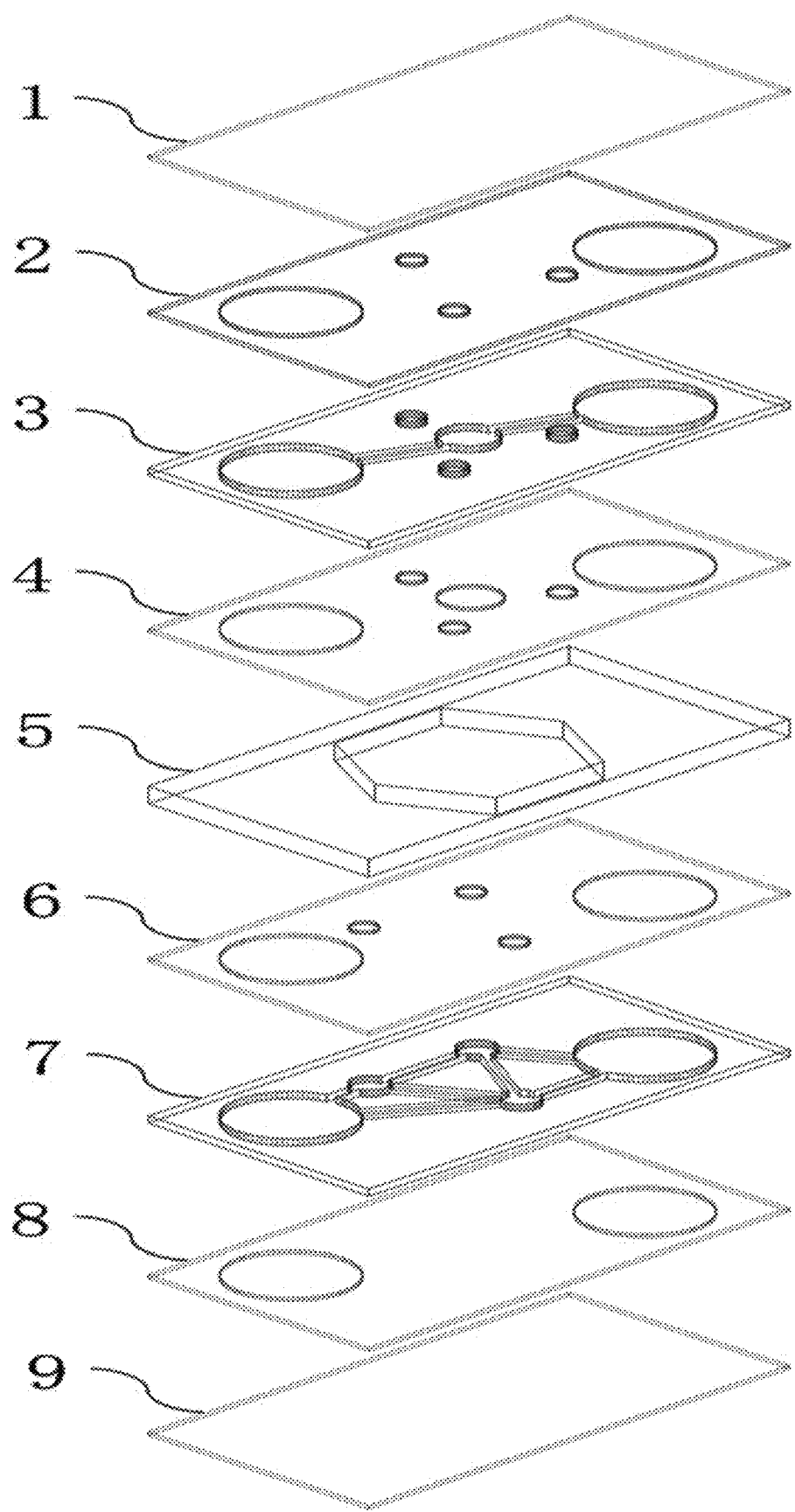
FIG. 2 is a schematic diagram of a split structure of the microfluidic bone organoid-on-chip according to the present disclosure.
Figure 3:
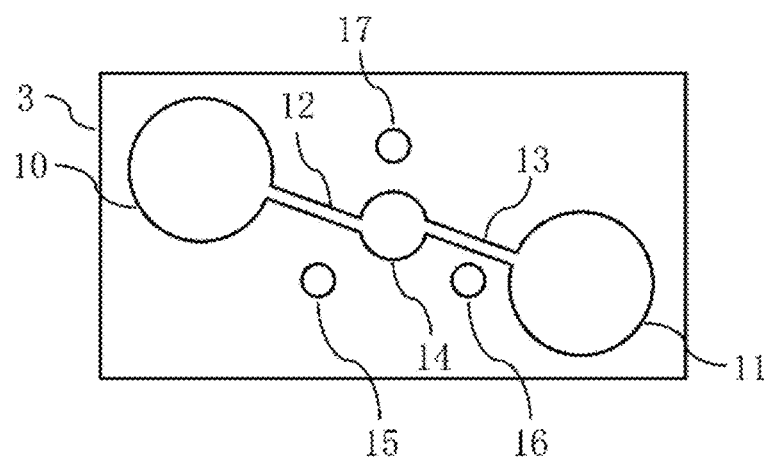
FIG. 3 is a schematic diagram of a structure of the liquid inlet layer of the microfluidic bone organoid-on-chip according to the present disclosure.
Figure 4:
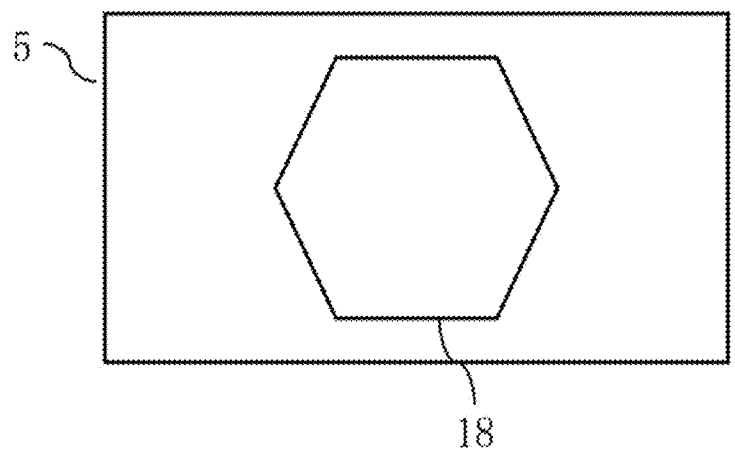
FIG. 4 is a schematic diagram of a structure of the support layer of the microfluidic bone organoid-on-chip according to the present disclosure.
Figure 5:
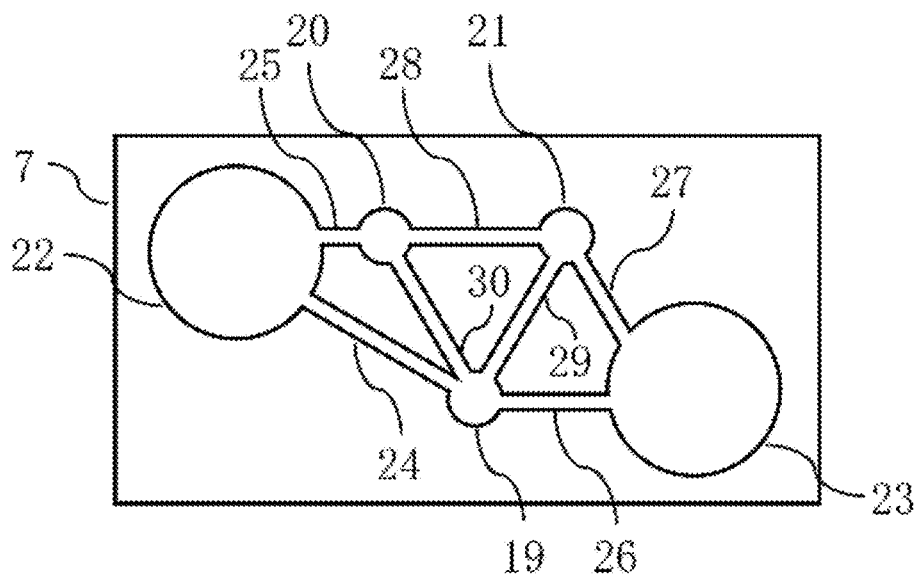
FIG. 5 is a schematic diagram of a structure of the liquid outlet layer of the microfluidic bone organoid-on-chip according to the present disclosure.

As shown in FIG. 1, a method for constructing a microfluidic bone organoid-on-chip is provided, including the following steps:
    (1) A visual three-dimensional cell cultivation platform is built to continuously observe impacts of different external factors on a ternary regulation theory based on angiogenesis of osteoclast precursors, osteoblasts and osteoclasts such that a user is allowed to directly observe interactions among various kinds of cells.
    (2) Microfluidic channels are designed in a chip to allow a reagent involved to present a concentration gradient distribution in the chip.
    (3) Three bioinks including osteoblasts, osteoclasts and vascular endothelial cells respectively are added to allow the chip to have an osteoblast zone, an osteoclast zone, a vascular endothelial cell zone, an osteoblast-osteoclast double-cell zone, an osteoblast-vascular endothelial cell double-cell zone, an osteoclast-vascular endothelial cell double-cell zone, and an osteoblast-osteoclast-vascular endothelial cell triple-cell zone, so as to reflect three cell components individually, in pairs, and as a whole in the chip.

In the present disclosure, a visual three-dimensional cell cultivation platform is built to continuously observe impacts of different external factors on a ternary regulation theory based on angiogenesis of osteoclast precursors, osteoblasts and osteoclasts such that a user is allowed to directly observe interactions among various kinds of cells, microfluidic channels are designed in a chip to allow a reagent involved to present a concentration gradient distribution in the chip, and three bioinks including osteoblasts, osteoclasts and vascular endothelial cells respectively are added to allow the chip to have an osteoblast zone, an osteoclast zone, a vascular endothelial cell zone, an osteoblast-osteoclast double-cell zone, an osteoblast-vascular endothelial cell double-cell zone, an osteoclast-vascular endothelial cell double-cell zone, and an osteoblast-osteoclast-vascular endothelial cell triple-cell zone, so as to reflect three cell components individually, in pairs, and as a whole in the chip. Therefore, the method can continuously observe the impacts of different external factors on the ternary regulation theory based on angiogenesis of osteoclast precursors, osteoblasts and osteoclasts, can allow a user to directly observe the interactions among various kinds of cells, and can allow a reagent involved to present a concentration gradient distribution in the chip, such that the impacts of the reagent at different concentrations on cells can be observed intuitively and conveniently.

As shown in FIG. 2 to FIG. 5, an apparatus for constructing a microfluidic bone organoid-on-chip is also provided, including:
    top layer 1, where the top layer is a flat plate configured to seal a top of the apparatus;

liquid inlet layer 3 provided with first left liquid inlet 10 and first right liquid inlet 11 at left and right edges, respectively, where the first left liquid inlet and the first right liquid inlet are centro-symmetrical and each have a specified volume to store a cell culture solution; central hole 14 is formed at a center of the liquid inlet layer and communicates with the first left liquid inlet and the first right liquid inlet through first left channel 12 and first right channel 13, respectively; and three second liquid inlets 15, 16, and 17 are formed in an equilateral triangle around the central hole, and the second liquid inlets each are filled with a bioink;

support layer 5 including symmetrical regularly-polygonal cultivation groove 18, where the cultivation groove encloses the second liquid inlets from below, the bioink is cured after entering the support layer, and cells grow in the support layer;

first lower interlayer 6 provided with second large circular holes symmetrically at left and right edges, respectively, where three small circular holes are formed in an inverted equilateral triangle around a center;

liquid outlet layer 7 provided with left waste liquid port 22 and right waste liquid port 23 symmetrically at left and right edges, where the left waste liquid port and the right waste liquid port communicate with the second large circular holes, respectively; liquid outlets 19, 20, and 21 that are not located in the same vertical plane as the second liquid inlets are formed around a center of the liquid outlet layer; and the liquid outlets communicate with the waste liquid ports through outflow channels 24, 25, 26, and 27, and the liquid outlets communicate with each other through liquid outlet channels 28, 29, and 30; and bottom layer 9, where the bottom layer is a flat plate configured to seal a bottom of the apparatus.

Preferably, the apparatus further includes first upper interlayer 2 arranged between the top layer and the liquid inlet layer. First large circular holes are formed at left and right edges of the first upper interlayer, respectively, and three first small circular holes are formed in an equilateral triangle around a center of the first upper interlayer. The first liquid inlets communicate with the first large circular holes, and the second liquid inlets communicate with the first small circular holes.

Preferably, the apparatus further includes second upper interlayer 4. The second upper interlayer has a same structure as the first upper interlayer, is arranged between the liquid inlet layer and the support layer, and seals the first left and right channels.

Preferably, the apparatus further includes first lower interlayer 6. Second large circular holes are formed at left and right edges of the first lower interlayer, respectively, and three second small circular holes that are not located in the same vertical plane as the second liquid inlets are formed around a center of the first lower interlayer. The regularly-polygonal cultivation groove, the second small circular holes and the liquid outlets communicate with each other, and the second large circular holes communicate with the waste liquid ports.

Preferably, the second small circular holes refer to three small circular holes formed in an inverted equilateral triangle around the center of the first lower interlayer.

Preferably, a shape of the regularly-polygonal cultivation groove is a regular hexagon.

Preferably, the apparatus further includes second lower interlayer 8. Third large circular holes are formed at left and right edges of the second lower interlayer, respectively, and communicate with the waste liquid ports, respectively.

The present disclosure is described in detail below in conjunction with the accompanying drawings and embodiments.

The apparatus is a bone microphysiological system that is based on the "ternary regulation theory" and has a three-dimensional structure.

1) A structure of the apparatus: There are 9 layers in total:
a) Top layer 1 configured to play a role of sealing an upper layer.
b) First upper interlayer 2 configured to play a role of partially sealing a first layer.
c) Liquid inlet layer 3: The first layer is a layer in which liquid inlets are located. A cell culture solution enters the system through liquid inlets 10 and 11 that are formed centro-symmetrically at two ends. The liquid inlets are defined as first liquid inlets. The liquid inlets each have a specified volume and can store a specified amount of a cell culture solution. An indicator in the cell culture solution can visually reflect a drug concentration in the cell culture solution. Cell culture solutions in the liquid inlets A at two sides are pooled through the centro-symmetrical channels 12 and 13 at two sides to central hole 14 located at a center and enters a second layer, and a drug concentration gradient required for investigation is formed from top to bottom in the second layer. Three small holes 15, 16, and 17 formed in an equilateral triangle around the central hole are liquid inlets for three different bioinks (which each are a mixture of a material and a cell), and are defined as second liquid inlets. The second liquid inlets are also channels for the bioinks to directly enter the second layer. The two types of liquid inlets can be modified in terms of the number and locations according to needs of an experiment. In an application range of the "three-dimensional regulation theory" for bone tissues, cells included in the three different bioinks are osteoblasts, osteoclasts and vascular endothelial cells, respectively.
d) First upper interlayer 4 configured to play a role of partially sealing a first layer.
e) Support layer 5: The support layer includes symmetrical regularly-polygonal cultivation groove 18. A bioink will be cured after entering the second layer, and cells will grow in the support layer. A thickness of the support layer determines a height of a three-dimensional medium composed of a crosslinked bioink and a diffusion distance of a cell culture solution including a drug.
f) First lower interlayer 6 configured to play a role of partially sealing a third layer.
g) Liquid outlet layer 7: The third layer is a layer in which liquid outlets are located. A cell culture solution and a bioink enter the liquid outlet layer after passing through the second layer, and then leave the system. The liquid outlet layer includes liquid outlets 19, 20, and 21 and centro-symmetrical waste liquid ports 22 and 23. After passing through the second layer, all liquids in the system are discharged through the liquid outlets, outflow channels 24, 25, 26, and 27, and the waste liquid ports sequentially. The waste liquid ports each have a specified volume and can store a specified amount of a waste liquid. To avoid blocking, the liquid outlets should not be located in the same vertical plane as the second liquid inlets. Channels 28, 29, and 30 among the liquid outlets also play a role of preventing the system from being blocked. The relative positions of the second liquid inlets and the liquid outlets also affect a concentration gradient distribution of a test drug.

h) Second lower interlayer 8 configured to play a role of partially sealing a third layer.

i) Bottom layer 9 configured to play a role of sealing a lower layer.

2) Materials of the apparatus: A main body of the apparatus is made of polydimethylsiloxane (PDMS). A bioink is composed of a cross-linkable natural biomaterial, a cross-linking agent, and a cell. The types of a cell culture solution and a test drug can be selected according to cultivation needs.

3) A size of the apparatus: The size can be adjusted as needed. In an assumed state, the apparatus has a length of about 4 cm and a width of about 2 cm as a whole.

A use method of the apparatus is as follows:

Step 1: The layers are cleaned, subjected to surface modification with a plasma, and then assembled.

Step 2: Internal pipes are cleaned with an alcohol and then disinfected with ultraviolet (UV) irradiation.

Step 3: A bioink is injected into the system through the second liquid inlets, and cell culture solutions with different concentrations of a drug are injected into the first liquid inlets, respectively. In the system, the two pass through the second layer under gravity actions and enter the liquid outlets of the third layer.

Step 4: A bioink in the support layer is induced to undergo thermal or optical crosslinking, then the system is incubated in an incubator, and a corresponding indicator change is observed as needed.

The above are merely the preferred embodiments of the present disclosure and are not intended to limit the present disclosure in any form. Any simple modifications and equivalent changes and modifications made to the above embodiments according to the technical essence of the present disclosure are within the protection scope of the technical solutions of the present disclosure.

What is claimed is:

1. An apparatus for constructing a microfluidic bone organoid-on-chip, wherein the apparatus comprises a plurality of horizontally-extending layers arranged in a vertical stack such that each layer of the vertical stack is in a direct surface contact with an adjacent layer above and/or below each layer, the plurality of layers comprising:
   a top layer comprising a first top surface and a first bottom surface, wherein the top layer is extended horizontally and forms an uppermost layer of the vertical stack, wherein the top layer is a flat plate;
   a first upper interlayer comprising a second top surface and a second bottom surface, wherein the second top surface is in direct contact with the first bottom surface, and wherein the first upper interlayer is extended horizontally and located below the top layer;
   a liquid inlet layer comprising a third top surface and a third bottom surface, wherein the third top surface is in direct contact with the second bottom surface, and wherein the liquid inlet layer is extended horizontally and is located below the first upper interlayer and comprises:
      a first liquid inlet and a second liquid inlet extended vertically between the third top surface and the third bottom surface and located on opposing ends of the liquid inlet layer along a horizontal axis;
      a central hole at a center of the liquid inlet layer and between the first liquid inlet and the second liquid inlet, and connected to the first liquid inlet and the second liquid inlet; and
      three second liquid inlets arranged around the central hole and between the first liquid inlet and the second liquid inlet;
   a second upper interlayer comprising a fourth top surface and a fourth bottom surface, wherein the fourth top surface is in direct contact with the third bottom surface, and wherein the second upper interlayer is extended horizontally and located below the liquid inlet layer;
   a support layer comprising a fifth top surface and a fifth bottom surface, wherein the fifth top surface is in direct contact with the fourth bottom surface, and wherein the support layer is extended horizontally and located below the second upper interlayer and is located below the second upper interlayer and comprises a symmetrical cultivation groove with a polygonal cross-section, and wherein the groove is recessed downward into the support layer;
   a first lower interlayer comprising a sixth top surface and a sixth bottom surface, wherein the sixth top surface is in direct contact with the fifth bottom surface, and wherein the first lower interlayer is extended horizontally and located below the support layer and comprises:
      a first circular hole and a second circular hole located on opposite lateral sides of the first lower interlayer; and
      three circular holes with diameters less than the first circular hole and the second circular hole and located between the first circular hole and the second circular hole in the first lower interlayer;
   a liquid outlet layer comprising a seventh top surface and a seventh bottom surface, wherein the seventh top surface is in direct contact with the sixth bottom surface, and wherein the liquid outlet layer is extended horizontally and located below the first lower interlayer and comprises:
      a first waste liquid port and a second waste liquid port located on opposite lateral sides of the liquid outlet layer, wherein the first waste liquid port and the second waste liquid port are connected to the first circular hole and the second circular hole of the first lower interlayer, respectively;
      liquid outlets connected to the first waste liquid port and the second waste liquid port, wherein the liquid outlets are channels extending laterally from each of the first waste liquid port and the second waste liquid port toward a lateral edge of the liquid outlet layer; and
   a second lower interlayer comprising an eighth top surface and an eighth bottom surface, wherein the eighth top surface is in direct contact with the seventh bottom surface, and wherein the second lower interlayer is extended horizontally and located on a top surface of a bottom layer of the vertical stack, wherein the bottom layer is a flat plate.

2. The apparatus for constructing the microfluidic bone organoid-on-chip according to claim 1, wherein a polygon cross-section of the symmetrical cultivation groove is a hexagon cross-section.

* * * * *